(12) United States Patent
Mizukami et al.

(10) Patent No.: US 9,644,091 B2
(45) Date of Patent: May 9, 2017

(54) POLYMER COMPOSITION AND MOLDED PRODUCTS FORMED THEREOF

(71) Applicants: SANC SALAAM CORPORATION, Osaka (JP); KURARAY LIVING CO., LTD., Osaka (JP)

(72) Inventors: Yoshikatsu Mizukami, Osaka (JP); Eiji Akiba, Osaka (JP)

(73) Assignees: Sanc Salaam Corporation, Osaka (JP); Kuraray Living Co., Ltd., Osaka (JP)

( * ) Notice: Subject to any disclaimer, the term of this patent is extended or adjusted under 35 U.S.C. 154(b) by 281 days.

(21) Appl. No.: 13/943,129

(22) Filed: Jul. 16, 2013

(65) Prior Publication Data

US 2013/0303043 A1 Nov. 14, 2013

Related U.S. Application Data

(62) Division of application No. 12/602,663, filed as application No. PCT/JP2009/000762 on Feb. 23, 2009, now Pat. No. 8,519,033.

(30) Foreign Application Priority Data

Feb. 22, 2008 (JP) .................................. 2008-040959
Feb. 16, 2009 (JP) .................................. 2009-032132

(51) Int. Cl.
| | | |
|---|---|---|
| *C09D 11/00* | (2014.01) | |
| *C08L 23/00* | (2006.01) | |
| *H01G 9/00* | (2006.01) | |
| *C08L 27/16* | (2006.01) | |
| *C08L 23/02* | (2006.01) | |
| *C08L 23/08* | (2006.01) | |
| *C08L 23/10* | (2006.01) | |
| *C09D 5/08* | (2006.01) | |
| *C09D 5/24* | (2006.01) | |
| *C09D 11/10* | (2014.01) | |
| *C09D 11/52* | (2014.01) | |
| *C09J 123/02* | (2006.01) | |
| *C09J 123/08* | (2006.01) | |
| *H01G 9/02* | (2006.01) | |
| *H01M 2/16* | (2006.01) | |
| *C08L 23/06* | (2006.01) | |
| *C08L 23/12* | (2006.01) | |
| *C08K 5/00* | (2006.01) | |
| *C08L 29/14* | (2006.01) | |

(52) U.S. Cl.
CPC .............. *C08L 27/16* (2013.01); *C08L 23/02* (2013.01); *C08L 23/06* (2013.01); *C08L 23/0853* (2013.01); *C08L 23/10* (2013.01); *C08L 23/12* (2013.01); *C09D 5/08* (2013.01); *C09D 5/24* (2013.01); *C09D 11/10* (2013.01); *C09D 11/52* (2013.01); *C09J 123/02* (2013.01); *C09J 123/0853* (2013.01); *H01G 9/02* (2013.01); *H01M 2/16* (2013.01); *C08K 5/0008* (2013.01); *C08L 29/14* (2013.01); *C08L 2205/02* (2013.01); *C08L 2205/03* (2013.01); *Y10T 428/265* (2015.01); *Y10T 428/3154* (2015.04); *Y10T 442/60* (2015.04); *Y10T 442/671* (2015.04)

(58) Field of Classification Search
CPC ......... H01B 1/00; C08L 101/00; B23B 27/00; C08K 5/00; C09D 11/00; C09D 201/00; H01G 9/02; H01M 2/16
See application file for complete search history.

(56) References Cited

U.S. PATENT DOCUMENTS

| | | | |
|---|---|---|---|
| 4,080,357 A * | 3/1978 | Gergen et al. | ................. 524/505 |
| 4,110,303 A * | 8/1978 | Gergen et al. | ................. 524/505 |
| 4,439,811 A | 3/1984 | Sasaki et al. | |
| 4,677,017 A | 6/1987 | DeAntonis et al. | |
| 5,225,471 A | 7/1993 | Tajima et al. | |
| 5,244,961 A | 9/1993 | Yu et al. | |
| 5,451,454 A | 9/1995 | Fukahori et al. | |

(Continued)

FOREIGN PATENT DOCUMENTS

| | | |
|---|---|---|
| EP | 0 525 660 A1 | 2/1993 |
| JP | 61-146301 | 7/1986 |

(Continued)

OTHER PUBLICATIONS

M.R.J. Sherer "Double-Gyroid-Structured Functional Materials", Springer Theses, DOI: 10.1007/978-3-319-00354-2_2 (2012), Chapter 2.*
Crossland, Edward "Block Copolymer Patterning of Functional Materials", May 2008, dissertation sumitted for the degree of Doctor of Philosophy, University of Cambridge, Chapter 7.*
International Search Report for corresponding Application No. PCT/JP2009/000762 mailed Mar. 24, 2009.
Form PCT/ISA/237 for corresponding Application No. PCT/JP2009/000762 mailed Mar. 24, 2009.
Notice of Reasons for Rejection for corresponding Japanese Application No. 2009-523502 dated Sep. 29, 2009 (with English translation).

(Continued)

*Primary Examiner* — Mark Kopec
(74) *Attorney, Agent, or Firm* — Renner, Otto, Boisselle & Sklar, LLP

(57) ABSTRACT

The present invention provides a polymer composition including a first base polymer (A) containing at least a thermoplastic polymer, a second base polymer (B) containing at least a thermoplastic polymer and not having compatibility with the first base polymer (A), and an additive (C) containing at least a substance not having compatibility with any of the first base polymer (A) and the second base polymer (B), the additive (C) being in the form of liquid or slurry at the lower of a pyrolysis temperature of the first base polymer (A) and a pyrolysis temperature of the second base polymer (B). (A), (B) and (C) are phase-separated from each other, and interfaces each located between two of phases of (A), (B) and (C) contacting each other form three-dimensional continuous parallel interfaces.

22 Claims, No Drawings

(56) References Cited

U.S. PATENT DOCUMENTS

| | | | |
|---|---|---|---|
| 5,472,782 A * | 12/1995 | Naritomi | C08L 53/02 428/412 |
| 5,681,963 A | 10/1997 | Liss | |
| 5,804,625 A | 9/1998 | Temperante et al. | |
| 5,804,628 A | 9/1998 | Busnel et al. | |
| 6,364,987 B1 | 4/2002 | Takada et al. | |
| 6,391,326 B1 | 5/2002 | Crepeau et al. | |
| 6,391,471 B1 | 5/2002 | Hiraoka et al. | |
| 6,425,948 B1 | 7/2002 | Nowak et al. | |
| 6,528,584 B2 | 3/2003 | Kennedy et al. | |
| 6,565,763 B1 | 5/2003 | Asakawa et al. | |
| 6,677,403 B1 | 1/2004 | Abe | |
| 7,148,281 B2 | 12/2006 | Vilkman et al. | |
| 7,192,634 B2 | 3/2007 | Carter et al. | |
| 7,799,416 B1 | 9/2010 | Chan et al. | |
| 2003/0026995 A1 | 2/2003 | Duchesne | |
| 2004/0211678 A1 | 10/2004 | Edmondson | |
| 2005/0080210 A1 | 4/2005 | Jing et al. | |
| 2006/0231525 A1 | 10/2006 | Asakawa et al. | |
| 2007/0092705 A1 | 4/2007 | Lee et al. | |
| 2008/0045638 A1 * | 2/2008 | Chapman et al. | 524/425 |
| 2008/0281016 A1 * | 11/2008 | Martin | 523/113 |
| 2009/0093576 A1 | 4/2009 | Ballot et al. | |
| 2009/0258973 A1 | 10/2009 | Mizukami et al. | |
| 2009/0270545 A1 * | 10/2009 | Sahnoune et al. | 524/476 |
| 2009/0324863 A1 | 12/2009 | Mizukami et al. | |

FOREIGN PATENT DOCUMENTS

| | | |
|---|---|---|
| JP | 05-239256 | 9/1993 |
| JP | 05-287084 | 11/1993 |
| JP | 08-507572 | 8/1996 |
| JP | 09-169867 | 6/1997 |
| JP | 10-330528 | 12/1998 |
| JP | 11-080414 | 3/1999 |
| JP | 2000-001612 | 1/2000 |
| JP | 2001-151834 | 6/2001 |
| JP | 2001-172453 | 6/2001 |
| JP | 2002-501572 | 1/2002 |
| JP | 2002-258476 | 9/2002 |
| JP | 2003-286414 | 10/2003 |
| JP | 2007-508415 | 4/2007 |
| JP | 3963941 | 6/2007 |
| RU | 2 089 569 C1 | 9/1997 |
| RU | 2 274 645 C2 | 10/2000 |
| RU | 2005 136 870 A | 4/2004 |
| RU | 2003107830 A | 9/2004 |
| RU | 2008 110 471 A | 8/2006 |
| SU | 2 107 702 C1 | 9/1992 |
| WO | 2008/044546 | 4/2008 |

OTHER PUBLICATIONS

Korean Office Action for corresponding Korean Application No. 9-5-2010-051962864 mailed Nov. 16, 2010 with English translation.

Russian Office Action for corresponding Russian Application No. 2010133659 issued Oct. 24, 2011 with English language translation.

Notice of Allowance for co-pending U.S. Appl. No. 12/602,663 mailed Apr. 26, 2013.

* cited by examiner

POLYMER COMPOSITION AND MOLDED PRODUCTS FORMED THEREOF

This application is a divisional of U.S. application No. 12/602,663 filed Dec. 2, 2009, now U.S. Pat. No. 8,519,033, which is a national phase of International Application No. PCT/JP2009/000762, filed Feb. 23, 2009, which claims priority to JP 2008-040959 filed Feb. 22, 2008 and JP 2009-032132 filed Feb. 16, 2009.

TECHNICAL FIELD

The present invention is directed to a polymer composition, and more particularly, to a polymer composition which is a mixture of a first base polymer (A), a second base polymer (B) and an additive (C), which do not have compatibility with each other.

BACKGROUND ART

Three-dimensionally cross-linked rubbers, or liquid/polymer emulsions described in Patent Document 1, are the only disclosed thermoplastic polymer compositions that quasi-stably hold a large amount of a third component which is a functional liquid which does not have compatibility with matrix polymers, without significantly impairing basic physical properties thereof.

Three-dimensionally cross-linked rubbers do not have thermoplasticity and therefore are difficult to extrude. Therefore, it is difficult to produce films, fibers or the like from three-dimensionally cross-linked rubbers.

The liquid/polymer emulsions described in Patent Document 1 have a discontinuous phase. Therefore, when the liquid/polymer emulsions are molded into a film or the like, a liquid or a polymer contained therein cannot penetrate from one side of the molded product to the other while being kept in a continuous state.

The liquid/polymer emulsions require a combination of a liquid, an interface forming block copolymer and a polymer, which are emulsified, however, the three components cannot be arbitrarily combined. Also, the emulsions have a discontinuous phase. Moreover, these emulsions are not disrupted even if diluted.

A polymer composition has not yet been disclosed which quasi-stably holds a large amount of a third component which is a functional liquid and in which the structure of holding the third component is disrupted if diluted.

Patent Document 2 describes that "While fluoropolymers have been used to coat metallic substrates for non-stick properties (e.g., cookware) and also for corrosion protection (e.g., chemical tanks, exhaust ducts), their non-stick characteristics lead to challenges when bonding fluoropolymers to substrates. Typically, the bonding of fluoropolymers to metallic substrates initially involves the use of chemical etching or high pressure grit blasting to give a rough profile to the substrate. A primer is then applied. Known thermally stable binders, such as polyamideimide, polyethersulfone, polyphenylene sulfide, polyetheretherketone, and the like, are not known to chemically interact with fluoropolymers, which limits the use of these substances as primers. The primers may be a powder, or more commonly are applied from solvent or via an aqueous solution. The article usually is baked at the necessary temperatures to attain bonding and drive off solvents or liquid carriers. A fluoropolymer topcoat typically is then applied and baked to fuse the fluoropolymer into a protective or decorative coating." As described therein, the step of applying a coating of a fluorine-based resin is complicated and economically expensive.

Patent Document 1: Gazette of Japanese Patent No. 3963941

Patent Document 2: Gazette of Japanese National Phase PCT Laid-Open Publication No. 2007-508415

DISCLOSURE OF INVENTION

Object of the Invention

An object of the present invention is to supply: a polymer composition which quasi-stably contains a high content of a functional component without significantly impairing basic physical properties thereof; a highly insulating polymer product thereof and a dust collection filter containing the polymer composition; an soil releasing product containing the polymer composition; a polymer composition for separators containing the polymer composition; a battery, a condenser and a capacitor employing a film or fiber product formed of the polymer composition for separators; a highly electrically and thermally conductive plastic containing the polymer composition; and the like, at lower prices.

Means for Solving the Problems

A polymer composition of the present invention includes a first base polymer (A) containing at least a thermoplastic polymer, a second base polymer (B) containing at least a thermoplastic polymer and not having compatibility with the first base polymer (A), and an additive (C) containing at least a substance not having compatibility with any of the first base polymer (A) and the second base polymer (B). The additive (C) is in the form of liquid or slurry at the lower of a pyrolysis temperature of the first base polymer (A) and a pyrolysis temperature of the second base polymer (B). The first base polymer (A), the second base polymer (B) and the additive (C) are phase-separated from each other, and interfaces each located between two of phases of (A), (B) and (C) contacting each other form three-dimensional continuous parallel interfaces.

The term "slurry" as used herein refers to a mixture (fluid) of a liquid and a powder which has fluidity.

The term "three-dimensionally continuous parallel interface" as used herein refers to each of the opposite sides of a layer which separates two spaces (regions) in a gyroid structure. The term "gyroid structure" as used herein refers to a type of interconnected structure in which a continuous layer periodically extends throughout space, dividing the space into two regions. The two regions are separated from each other by the layer and do not contact each other. Note that the term "interconnected structure" as used herein refers to a structure in which two spaces separated by a layer (or an interface) are infinitely connected to each other.

Effects of the Invention

The polymer composition of the present invention can quasi-stably contain a high content of a functional component without significantly impairing basic physical properties of a matrix polymer.

BEST MODE FOR CARRYING OUT THE INVENTION

In an embodiment of the present invention, at least one of the first base polymer (A) and the second base polymer (B)

is not rubber (elastomer), and the polymer composition which is a mixture of the three components is also not rubber (elastomer). Therefore, the polymer composition of the embodiment can be extruded to produce a film, a fiber or the like.

Also, the additive (C) is in the form of liquid or slurry at the lower of a pyrolysis temperature of the first base polymer (A) and a pyrolysis temperature of the second base polymer (B). However, the additive (C) substantially does not undergo pyrolysis even at the pyrolysis temperature, in the presence of a pressure higher than atmospheric pressure (e.g., inside a mixing extruder).

In a preferred embodiment of the present invention, (A), (B) and (C) form a parallel layer having a gyroid structure, and (A) and (B) occupy two respective regions separated by (C). The three-dimensional continuous parallel interfaces include an interface α between (B) and (C) and an interface β between (A) and (C) of a layer formed of (C), and an interface γ between (A) and (B). The interfaces α, β and γ are parallel with each other, and three-dimensionally and continuously extend throughout space.

When the first base polymer (A) may be a blend of two or more polymers, the pyrolysis temperature of the first base polymer (A) corresponds to the lowest of the pyrolysis temperatures of the blended polymers, what holds true for the pyrolysis temperature of the second base polymer (B).

Also, one form of the embodiment provides the polymer composition in which (C) is at least one of thermoplastic polymers, thermoplastic oligomers, oils, insecticides, pheromones, repellents, attractants, adhesives, surfactants, release agents, antibacterial agents, antifungal agents, flame resistant agents, lubricating agents, low-friction agents, reinforcing materials, electro-conductive agents, heat transfer agents, anti-corrosion agents, and electrolytic solutions, and molded products formed thereof. The molded product may include the polymer composition as a part thereof, and may be, for example, a multilayer film including a layer formed of the polymer composition.

Also, one form of the embodiment provides a molded product which is obtained by molding a dilution of the polymer composition with one of (A), (B), and a polymer having compatibility with (A) or (B). Also, this molded product can have a film formed of (C) having a thickness from 0.001 μm to 2 μm on a surface thereof.

Also, one form of the embodiment provides the molded product which is an extrusion-molded product or an injection-molded product in the form of a film, a fiber or the like. Also, this form of the embodiment provides a film in which (C) is an edible oil, a film in which (C) is an adhesive, a film, a fiber or a fiber product in which (C) is a surfactant. Also, this form of the embodiment provides a film and a laminated product in which (C) is an anti-corrosion agent.

Also, one form of the embodiment provides the polymer composition in which (C) contains a polymer or a polyblend as a major component, and molded products formed thereof.

A preferable form of the embodiment provides the polymer composition in which at least one of (A), (B) and (C) has an electrical resistance of $10^{15}$ Ωcm or more, and molded products formed thereof. The molded product is a fiber product, a melt blown nonwoven fabric, or a multilayer structure including a melt blown nonwoven fabric. The molded product is also preferably an electret-treated filter.

Also, one form of the embodiment provides the polymer composition in which at least one of (A), (B) and (C) is a thermoplastic adhesive, and molded products formed thereof.

A preferable form of the embodiment provides the polymer composition which is a thermoplastic adhesive having a strong bond strength with respect to at least one of ceramic, metal, wood and plastic and used for these substances, and molded products formed thereof, or a molded composite product which is a multilayer structure of a fluoropolymer molded product and the polymer composition, which is an soil releasing molded product.

Also, one form of the embodiment provides the polymer composition in which at least one of (A), (B) and (C) is a gas barrier thermoplastic resin. Preferably, this form of the embodiment provides the polymer composition in which the gas barrier resin is poval-vinyl acetate copolymer, and molded products formed thereof.

Also, one form of the embodiment provides the polymer composition in which at least one of (A), (B) and (C) is one of polyolefin resins, modified polyolefin resins, and polymer blends containing at least one of polyolefin resins and modified polyolefin resins, and molded products formed thereof.

A preferable form of the embodiment provides the polymer composition in which at least one of (A), (B) and (C) is one of fluoropolymers, modified fluoropolymers, and polymer blends containing at least one of fluoropolymers and modified fluoropolymers, and molded products formed thereof. The molded product is preferably a film or fiber product which is a separator for condensers or capacitors.

Also, a preferable form of the embodiment provides a battery separator film or fiber product in which (C) is a battery electrolytic solution, and a secondary battery employing the separator film or fiber product.

Also, one form of the embodiment provides a suspension, a slurry, an ink or a paint which contains the polymer composition. The polymer suspension or slurry can be produced by a known production method in which the polymer composition is dispersed by stirring at the melting temperature or higher in a dispersion medium in which (C) does not dissolve, followed by addition of an appropriate surfactant, resulting in a quasi-stable state.

Also, one form of the embodiment provides the polymer composition in which at least one of (A), (B) and (C) is an epoxy curing catalyst, and molded products formed thereof. Preferably, this form of the embodiment provides the polymer composition in which the epoxy curing catalyst is an imidazole-based compound, and a powder catalyst containing the polymer composition.

Also, one form of the embodiment provides the polymer composition in which (C) is a metal or an inorganic compound, and molded products formed thereof. Preferably, this form of the embodiment provides the polymer composition in which (C) is tin or a tin alloy and therefore which is highly electrically and thermally conductive, and molded products formed thereof.

(A) used in the embodiment contains at least one thermoplastic polymer. (B) used in the embodiments also contains at least one thermoplastic polymer. As a thermoplastic polymer, a thermoplastic precursor which becomes a thermosetting polymer after reaction can also be used in (A) and (B). Note that, when such a thermoplastic precursor is used as at least one of (A) and (B), the thermoplastic precursor is one which does not undergo a significant reaction in a molten state to an extent which impairs formation of three-dimensional continuous parallel interfaces, or a mixingconditions are selected which prevents such a reaction. Examples of the thermoplastic polymer include thermoplastic fluoropolymers such as polydifluoroethylene and the like, polyethylenes such as HDPE, LDPE, LLDPE and the like, addition polymers such as polypropylene, polyisoprene, polybutene, polystyrene, polymethacrylate, modified forms thereof and the like, polyesters such as PET, PBT, PTT, PLA and the like, polyamides such as nylon 6, nylon 66, nylon 12 and the like, condensation polymers such as polycarbonate, polyurethane and the like, and the like. Examples of the thermoplastic precursor for a thermosetting polymer include a mixture of an unsaturated polyester resin precursor or a phenol resin precursor (novolac) and hexamine, a resin obtained by partially curing the mixture by heating, and the like. The thermosetting resin is molded before curing, and provides excellent heat resistance and dimensional stability.

The term "(A) and (B) do not have compatibility with each other" as used herein means that (A) and (B) are phase-separated even after trying to mix them in the molten sate by mechanical shearing, and therefore, an interface is formed therebetween. Therefore, (A) and (B) may be the same PEs if (A) and (B) can be phase-separated, e.g., a combination of an HDPE and an LDPE may be available. (A) and (B) may also be the same PPs if one of (A) and (B) is modified so that (A) and (B) can be phase-separated.

As a combination of (A) and (B), polyolefins which do not have compatibility with each other, or an addition polymer such as a polyolefin or the like and a condensation polymer such as a polyester or the like, can be used. However, it should be previously confirmed that, when two polyesters having different compositions, or a polyester and a polyamide, are used as (A) and (B), (A) and (B) do not significantly react each other in the molten state, and therefore, the three-dimensional continuous parallel interface structure is not disrupted and the inherent properties of the base polymer are not impaired. For the three-dimensional continuous parallel interface structure, it is preferable that the volume ratio of the base polymer (A) and the polymer (B) which does not have compatibility with the base polymer (A) in the molten state be close to 50:50. It is preferable that the volume ratio not be exactly 50:50, since the basic physical properties of the base polymer are less impaired. Moreover, the volume ratio of the organic substance (C) or a mixture (D) thereof to the total volume is ⅓ or less.

Examples of (C) which is in the form of liquid or slurry at a temperature which is lower than or equal to the pyrolysis temperature of (A) or (B) in the embodiment include thermoplastic polymers, thermoplastic oligomers, oils, insecticides, pheromones, repellents, attractants, pressure-sensitive adhesives, surfactants, release agents, antibacterial agents, antifungal agents, lubricating agents, low-friction agents, reinforcing materials, electro-conductive agents, heat transfer agents, adhesives, insulating materials, aromatic chemicals, agricultural chemicals, curing agents (catalysts), and the like.

As the release agent, a surfactant, an oil or the like is used. Specifically, examples of the release agent include edible oils such as butter, rapeseed oil, olive oil, soybean oil, corn oil, sesame oil, sunflower oil, cottonseed oil, safflower oil and the like, mineral oils and esters and ethers thereof, higher fatty acid salts, sorbitan esters, sorbitol esters, and EO or/and PO adducts thereof, silicone resins, and the like.

Specific examples of thermoplastic polymers and thermoplastic oligomers include thermoplastic fluoropolymers such as polydifluoroethylene PVDF, tetrafluoroethylene-ethylene copolymer ETFE, tetrafluoroethylene-perfluoroalkyl vinyl ether copolymer PFA and the like, highly insulating polymers and oligomers such as polystyrene and the like, polyethylene glycol, polypropylene glycol and modified forms and oligomers thereof, hydrophilic polymers and oligomers such as saponified polyvinyl acetate and the like, and the like.

Also, surfactants are of anionic, cationic, amphotericion, nonionic types and the like. Examples of surfactants include hydrophilic surfactants, such as sodium dodecylphenylsulfonate, glycerol monostearate and the like. Examples of properties of surfactants include, in addition to hydrophilic properties, wetting properties, penetrating properties, emulsifying properties, dispersing properties, foaming properties, washing properties, lubricating properties, antistatic properties, anti-corrosion properties, water repelling properties, aggregating properties, and the like.

Also, specific examples of water repellents and alcohol repellents include silicone resins, silicone oils, fluorine compounds, and the like. Specific examples of electro-conductive agents include ion-conducting substances, such as polyaniline aqueous solution, polyaniline dispersion, polypyrrole dispersion and the like, and the like. Moreover, examples of heat transfer agents and electro-conductive agents include tin, whose melting point is 231° C., a low-melting point alloy such as a solder or the like, and the like.

Also, specific examples of major components of thermoplastic adhesives for metal include glass, ceramic, polyvinyl butyrals such as "MOWITAL™" manufactured by KURARAY CO., LTD. and the like, mixtures of polyvinyl butyrals and epoxy resins, EVA, mixtures of EVA and epoxy resins, and the like.

Also, specific examples of major components of gas barrier resins includes poly(vinyl alcohol-vinyl acetate) copolymers such as "EVAL™" manufactured by KURARAY CO., LTD., nylon resins, vinylidene chloride resins, halogen-containing resins such as PVDF and the like, thermoplastic acrylic resins, and the like.

A multilayer structure including a thermoplastic fluoropolymer sheet of one form of the embodiment and glass, ceramic or metal is produced by attaching the layers to each other using as an intermediate layer the composition of the embodiment including a thermoplastic fluoropolymer as (A), a polybutyral as (B), and an EVA as (C). By providing the thermoplastic fluoropolymer as a surface layer, excellent soil releasing efficacy is imparted semipermamently. Plate-shaped products are produced by lamination and pressure thermoforming. Also, complicated products are produced by combining a pressure-thermoformed product of the multilayer structure and a molded product of glass, ceramic or metal by performing pressure thermoforming again, thereby producing glass, ceramic or metal products having an soil release surface.

The molded product is applicable to soil release earthenware such as toilet bowls, bathtubs and the like, and metal products such as sinks and the like.

Also, specific examples of antibacterial agents and antifungal agents include organic substances such as Triclosan, Paraben, dichlofluanid and the like, and solutions or dispersions thereof, and liquid paraffin dispersions of inorganic substances such as silver zeolite, copper zeolite, silver glass, silver apatite and the like, and the like.

Also, specific examples of insecticides and repellents include pyrethroid insecticides such as permethrin, phenothrin, pyrethrin, empenthrin, metofluthrin and the like, carbamate insecticides such as carbaryl, propoxur, fenobucarb and the like, organophosphorus insecticides such as parathion, dichlorvos, acephate and the like, nicotine-based insecticides such as nicotine sulfate and the like, chloronicotinyl insecticides such as imidacloprid, acetamiprid, dinotefuran and the like, terpene insecticides such as Teruchion (isobornyl thiocyanoacetate) and the like, and repellents such as DEET, farnesylacetone and the like.

Also, specific examples of anti-corrosion agents include dicyclohexylamine nitrite (DICHAN), diisopropylammonium nitrite (DIPAN), cyclohexylamine carbamate (CHC), benzotriazole (BTA), tolyltriazole (TTA), dicyclohexylammonium cyclohexanecarboxylate (DICHACHC), sodium nitrite (melting point: 271° C.), and the like.

Also, specific examples of insulating materials include thermoplastic fluoropolymers such as polydifluoroethylene, polydifluorochloroethylene, modified forms thereof and the like, polystyrene and copolymers thereof, and the like. Among them, polystyrene and copolymers thereof are preferable because of their higher insulating properties ($10^{15}$ Ωcm) and lower prices.

Also, specific examples of agricultural chemicals include antibacterial agents, bactericides, herbicides, and the like. For example, "thiuram" (bis(dimethylthiocarbamoyl)disulfide; melting point: 155° C.) of the dithiocarbamate family is known as an antibacterial agent or a bird repellent, and "isoprothiolane" (melting point: 54° C.) is a bactericide of the malonic ester family which strongly inhibits the hyphal growth of rice blast fungus (*Magnaporthe grisea*), white root rot fungus (*Rosellinia necatrix*) and the like. Also, propyzamide (melting temperature: 155° C.) is a herbicide for grass or lettuce, which highly effectively kills Poaceae plants and annual broad-leaved weeds.

Also, specific examples of epoxy curing catalysts include amine compounds, polyol compounds, imidazole compounds and the like. Among them, imidazole compounds are preferable in terms of handling. Among them, 2-undecyl imidazole and 1-cyanoethyl-2-phenyl imidazole are preferable as catalysts for powder coating in terms of production since their melting points are less than 120° C. and their active ranges are 130° C. or higher.

The present invention is not limited to these specific examples.

For a production method which imparts the three-dimensional continuous parallel interface structure, which is a characteristic feature of the embodiment, to a polymer, a kneader which provides large shear (e.g., a twin-screw extruder) is used. When a liquid additive is blended in the liquid state, a side-injection extruder is preferably used. When a liquid additive is solid at room temperature, the liquid additive is fed at a constant feed rate from a hopper.

As shear force is increased, the three-dimensional continuous parallel interfaces are formed finer. Therefore, it is preferable to increase the number of revolutions per minute of a screw under a temperature condition suited to the screw. The number of revolutions per minute of the screw is preferably 800 rpm or higher, more preferably 1,000 rpm or higher.

The thickness of the three-dimensional continuous parallel interfaces can be reduced to several nanometers. A liquid additive layer is formed and sandwiched by the three-dimensional continuous parallel interfaces. Therefore, in the three-dimensional continuous parallel interface structure which is extruded by an extruder and is then rapidly cooled and solidified, followed by pelletizing, the thickness of a liquid additive layer formed on a surface thereof is substantially equal to the thickness of a liquid additive layer sandwiched by the three-dimensional continuous parallel interfaces. This is because, whereas the pellet contains a large amount of the liquid additive, the pellet maintains a dry-touch feel.

In this embodiment, (C) forms a film of a gyroid structure, and (A) and (B) occupy two respective regions which are separated by (C). The three-dimensional continuous parallel interfaces are formed by the interface α between (B) and (C) and the interface β between (A) and (C) on the film formed of (C). The interface α and the interface β are parallel to each other and three-dimensionally and continuously extend throughout space.

Also, the three-dimensional continuous parallel interface structure emerges in a state where the volume ratio of the base polymer (A) to the base polymer (B) in the molten state is substantially 50:50. Therefore, addition of the base polymer (A) or (B) for dilution breaks down the balance, so that the three-dimensional continuous parallel interface structure is disrupted. If the three-dimensional continuous parallel interface structure is disrupted and therefore the polyblend forms a sea-island structure, the liquid additive bleeds out from the inside of the polymer onto the surface, so that the liquid additive exhibits a surface characteristic. Timing with which the lubricating effect is exhibited can be controlled by maintaining a thermal cure catalyst at room temperature and releasing for cross-linking during melting or, maintaining a surface lubricating agent, and moving the surface lubricating agent onto the surface during molding.

The composition of the embodiment is produced using a kneader, such as a twin-screw extruder or the like. When (C) or (D) is in the form of liquid or slurry during production, a liquid side-injection device, such as a multi-plunger pump or the like, is used to feed (C) or (D) at a constant feed rate by side-injection. After extrusion through a nozzle, the matrix polymer is solidified using a quench bath or the like and forms a strand, and strand is cut and shaped into pellets by a cutter. When the material cannot form a strand, granule is produced using an underwater cutter. If it is difficult to use these methods, the material is extruded into the shape of a sheet and is then cut using a roller cutter into rectangular pellets.

The composition of the embodiment may be used as a masterbatch or a compound.

Molded products, such as extrusion-molded products, injection-molded products and the like (the film and fiber products and the like of the embodiment), are produced by a commonly used production method using a masterbatch or a compound of the composition of the embodiment. For example, although dichlofluanid has a pyrolysis temperature of 150° C. or lower, a PP-based spunbond nonwoven fabric was successfully produced at 235° C. The reason why the PP-based spunbond nonwoven fabric was successfully produced by the aforementioned production method at a temperature higher than the commonly known pyrolysis temperature while suppressing the pyrolysis, is that pyrolysis reaction is a kind of equilibrium reaction. In other words, this is because commonly known pyrolysis temperatures are measured in an atmospheric pressure open system, and on the other hand, the molded product (spunbond) of the embodiment in which pyrolysis reaction occurs is a high pressure closed system, and this system significantly inhibits equilibrium reaction.

A metal tin has a melting point of 231° C., which is lower compared to most other metals, is relatively stable, and has excellent thermal conductivity. An injection-molded plate product formed of the composition of the embodiment including 20 w % of polycarbonate, 55 w % of a metal tin, and 25 w % of PET exhibited excellent electrical and thermal conductivity.

As described above, in the composition of the embodiment, an inorganic substance, such as a metal tin or sodium nitrite, which does not react with (A) or (B) can be used as (C), which means that the composition of the embodiment is physically constructed.

A polypropylene molded product in one form of this embodiment contains 0.2 to 1.0 w % of themerly molten unsalted butter supernatant at a surface of the molded product, 0.1 to 1.0 w % of themerly molten unsalted butter supernatant inside the molded product, and 0.5 to 10 w % of polyethylene most of which is finely dispersed in the vicinity of the surface of the molded product. Also, in one form thereof, the molded product is a release film. This product is in a state where the three-dimensional continuous parallel interface structure is disrupted.

The release film is produced as follows. Substantially equal volumes of polyethylene and polypropylene are fed from hoppers, and heat-melting unsalted butter supernatant is side-injected, followed by kneading and extrusion and then quenching to produce a masterbatch of the composition of the embodiment having the three-dimensional continuous parallel interface structure. The masterbatch is diluted with polyethylene, followed by lamination on aluminum foil by a T-die method.

Also, similarly, a release cup or the like can be produced by thin-film injection molding using a general injection molding machine without a liquid side-injection device.

If unsalted butter is heated at about 60° C., the butter is molten. Thereafter, if the molten butter is allowed to stand, the butter is separated into two layers, i.e., clear supernatant and whitish liquid (lower layer). The lower layer is a water emulsion containing protein. This protein causes butter to easily burn. If only this supernatant is used, it is possible to prevent coloring which would otherwise occur due to a heating process during film production.

Also, a polyethylene film molded product in one form of this embodiment is a wrap film having an adhesive layer whose thickness is 0.1 μm or more. As is similar to the release film, this product is in a state where the three-dimensional continuous parallel interface structure is disrupted.

A cross-section of the three-dimensional continuous parallel interface structure which emerges in the composition of this embodiment was observed using an optical microscope or a SEM. In addition, a base polymer section which is dispersed in a small amount in a diluted molded product was observed using a phase-contrast microscope. Moreover, a thickness of a vaporizable liquid additive provided on a surface of the molded product of the embodiment was calculated from a vaporization rate or the like. More details will be described by way of example.

EXAMPLES

Example 1

Soil Release Molded Product

Three components, i.e., 34 vol % of a thermoplastic PVDF (vinylidene fluoride-hexafluoropropylene copolymer) manufactured by DAIKIN INDUSTRIES, ltd. as (A), 36 vol % of PVDF (vinylidene fluoride) manufactured by DAIKIN INDUSTRIES, ltd. as (B), and 30 vol % of MOWITAL™ B30T manufactured by KURARAY CO., LTD., which is an adhesive polymer for glass, as (C), were fed at constant feed rates from hoppers of a high-speed rotation twin-screw kneading extruder. (A), (B) and (C), any two of which are phase-separated, were molten and kneaded, followed by extrusion into the shape of a strand, at a screw rotational speed of 1,200 rpm, at a maximum temperature of 320° C., which is lower than or equal to the pyrolysis temperatures of (A) and (B), and at a die temperature of 300° C. The strand was quenched in a water bath at 40° C. and was then cut, thereby obtaining compound pellets of a three-dimensional continuous parallel interface structure composition of Example 1.

A cross-section in an extrusion direction and another cross-section perpendicular thereto of the pellet, on which the fluorine component was stained with a metal, were observed using a SEM. As a result, a parallel multilayer structure was found, and therefore, it was confirmed that a three-dimensional continuous parallel interface structure was formed.

The compound was extruded and laminated through a T-die at 320° C. onto a PVDF (vinylidene fluoride-hexafluoropropylene copolymer) sheet having a thickness of 50 μm manufactured by DAIKIN INDUSTRIES, ltd., thereby producing a multilayer sheet as a molded product of Example 1.

The multilayer sheet and a glass plate which is 3 mm in thickness and 20 cm per side and whose surface had been cleaned, were stacked on each other, followed by hot pressing at 320° C., to produce a PVDF-glass multilayer structure of Example 1.

A PVDF surface of the PVDF-glass multilayer structure exhibited excellent water and oil repellent properties, which are possessed by PVDF itself. One ml of 15% hexane dilution of a soil component (carbon black: 16.7%, beef fat hardened oil: 20.8%, and liquid paraffin: 62.5%) was dropped onto a sample, which was then allowed to stand for one or more hours at room temperature to remove hexane by air drying, thereby attaching a spot-like soil. A wipe-off property test was conducted using a KAKEN (Japan Synthetic Textile Inspection Institute Foundation) type wipe-off property tester. As a result, the multilayer sheet of Example 1 exhibited an excellent soil release property, i.e., the quantity of the remainders of the hydrophilic soil and the lipophilic soil was small, as compared to a PP sheet (control). Moreover, the PVDF surface of this product had a thickness of as large as 42 μm and therefore exhibited excellent durability which enables the product to endure long-time use.

Example 2

Electret-Treated Filter

Three components, i.e., 44 vol % of an LDPE, NOVATEC™ (MFR: 2) manufactured by Japan Polyethylene Corporation, as (A), 46 vol % of a PP, Prime Polypro™ (MFR: 3) manufactured by Prime Polymer Co., Ltd., as (B), and 10 vol % of an insulating material, PSt polymer (MFR: 30) manufactured by PS-Japan Corporation, as (C), were fed at constant feed rates from hoppers of a high-speed rotation twin-screw kneading extruder. (A), (B) and (C), any two of which are phase-separated, were molten and kneaded, followed by extrusion into the shape of a strand, at a screw rotational speed of 1,200 rpm, at a maximum temperature of 230° C., which is lower than the pyrolysis temperature 350° C. of the PP polymer (B), and at a die temperature of 190° C. The strand was quenched in a water bath at 40° C. and was then cut, thereby obtaining a compound of a three-dimensional continuous parallel interface structure composition of Example 2.

A melt blown nonwoven fabric was produced using the compound. In this case, (A), (B) and (C) were decomposed by heating at a spinning temperature of 380° C., thereby reducing the molecular weights thereof, followed by an electret treatment, to obtain a melt blown nonwoven fabric of Example 2. It is known that, when a fabric which has been electret-treated so as to improve the dust collecting effect is exposed under a high humidity condition, isolated charge moves and therefore the effect of the electret treatment efficacy is reduced. After the melt blown nonwoven fabric was allowed to stand for 24 hours at 20° C. and 80 RH %, the dust collecting rate thereof was reduced by 12 %, which is smaller than about 20 % for typical PP melt blown nonwoven fabrics. Thus, the melt blown nonwoven fabric maintained the dust collecting effect at an excellent level.

A cross-section in an extrusion direction and another cross-section perpendicular thereto of the compound pellet, on which the PSt component was stained with a metal, were observed using a SEM. As a result, a parallel multilayer structure was found, and therefore, it was confirmed that a three-dimensional continuous parallel interface structure was formed.

Example 3

Anti-Corrosion Film

Three components, i.e., 36 vol % of an LDPE, NOVATEC™ (MFR: 0.9) manufactured by Japan Polyethylene Corporation, as (A), 34 vol % of a modified HDPE (MFR: 5) as (B), and 30 vol % of an anti-corrosion agent, sodium nitrite (melting temperature: 271° C.), as (C), were fed at constant feed rates from hoppers of a high-speed rotation twin-screw kneading extruder. (A), (B) and (C), any two of which are phase-separated, were molten and kneaded, followed by extrusion, at a screw rotational speed of 1,000 rpm, at a maximum temperature of 290° C., which is lower than the pyrolysis temperatures of (A) and (B), and at a die temperature of 270° C. The extrudate was cut using a hot cutter, followed by quenching in air, thereby obtaining an anti-corrosion masterbatch of a three-dimensional continuous parallel interface structure composition of Example 3. During production of the masterbatch, molten sodium nitrite did not blow out from the nozzle. Moreover, the pellet was not sticky. Although the pellet was slightly colored, there was not a problem with process ability.

The masterbatch pellet was boiled in water at a bath ratio of 100:1 for 20 min to remove the sodium nitrite. Thereafter, a cross-section in an extrusion direction and another cross-section perpendicular thereto were observed using a SEM. As a result, a parallel multilayer structure was found, and therefore, it was confirmed that a three-dimensional continuous parallel interface structure was formed.

Three w % of the masterbatch was diluted with 97 w % of an LDPE, NOVATEC™ (MFR: 0.9) manufactured by Japan Polyethylene Corporation. The diluted masterbatch was used to produce an anti-corrosion PE inflation film having a thickness of 100 μm and a width of 20 cm of Example 3 by a commonly used method. This film contained about 0.9 g/m² of sodium nitrite and was substantially transparent and colorless.

The anti-corrosion properties of the anti-corrosion PE film and a commercially available PE film were compared under a condition suited to film in conformity with JIS Z 1535 5.4 "volatile corrosion inhibitor treated paper." Occurrence of corrosion was not found in test pieces of the film of Example 3, and was found in test pieces of the commercially available film (control).

Example 4

Gas Barrier Film

Three components, i.e., i.e., 46 vol % of an LDPE, NOVATEC™ (MFR: 0.9) manufactured by Japan Polyethylene Corporation, as (A), 44 vol % of a modified HDPE (MFR: 5) as (B), and 10 vol % of a gas barrier resin, "EVAL™" (melting point: about 170° C., ethylene content: 38%) manufactured by KURARAY CO., LTD., as (C), were fed at constant feed rates from hoppers of a high-speed rotation twin-screw kneading extruder. (A), (B) and (C), any two of which are phase-separated, were molten and kneaded, followed by extrusion, at a screw rotational speed of 1,000 rpm, at a maximum temperature of 210° C., which is lower than the pyrolysis temperatures of (A) and (B), and at a die temperature of 200° C. The extrudate was cut using a hot cutter, followed by quenching in air, thereby obtaining a gas barrier compound of a three-dimensional continuous parallel interface structure composition of Example 4. A cross-section in an extrusion direction and another cross-section perpendicular thereto of the compound pellet, on which EVAL was stained with a metal, were observed using a SEM. As a result, a parallel multilayer structure was found, and therefore, it was confirmed that a three-dimensional continuous parallel interface structure was formed.

The compound was used to produce an inflation film of Example 4 having a thickness of 25 μm by a commonly used method. This film exhibited an oxygen gas transmission rate (23° C., 0% RH) of 0.5 ml·25 μ/m²·24hr·Atm. The oxygen gas transmission rate of 100% "EVAL" is 0.4. Therefore, although the absolute value was slightly smaller, substantially the same excellent oxygen gas barrier property was exhibited. Film made of 100% "EVAL" is disadvantageously more expensive than PE, has a narrower temperature range satisfying a film production condition, and is more easily gelated by a long-time operation. Typically, EVAL is used along with PE or the like in the form of a multilayer film, which is also aimed to reduce the cost. On the other hand, the compound of Example 4 can be handled under a production condition similar to that of typical PE, and is economical since the content of expensive "EVAL" used therein can be reduced.

Example 5

Separator

Two components, i.e., 44 vol % of a modified PP, Prime Polypro™ (MFR: 30) manufactured by Prime Polymer Co., Ltd., as (A) and 46 vol % of a PP (MFR: 30) as (B), were fed at constant feed rates from hoppers of a high-speed rotation twin-screw kneading extruder, and 10 vol % of propylene carbonate (electrolyte solvent) as (C) was fed by side-injection at a constant feed rate. (A), (B) and (C), any two of which are phase-separated, were molten and kneaded, followed by extrusion into the shape of a strand, at a screw rotational speed of 1,200 rpm, at a maximum temperature of 230° C., which is lower than the pyrolysis temperatures of (A) and (B), and at a die temperature of 190° C. The strand was quenched in a water bath at 40° C. and was then cut, thereby obtaining PP-compound pellets of a three-dimensional continuous parallel interface structure composition of Example 5. A cross-section in an extrusion direction and another cross-section perpendicular thereto of the pellet were observed using a SEM. As a result, a parallel multilayer structure was found, and therefore, it was confirmed that a three-dimensional continuous parallel interface structure was formed.

A spunbond of Example 5 having a basis weight of 20 g/m² was produced using the compound at spinning temperature of 230° C. by a commonly used method. In this spunbond, solvent was exposed on a fiber surface, and therefore, a capacitor in which the spunbond was used as a separator allowed electrolytic solution to be easily loaded without contamination of bubbles, resulting in a reduction in variations in capacitor capacity due to contamination of bubbles.

Example 6

Electrical Conductivity Polymer

Three components, i.e., 44 vol % of a modified PP, Prime Polypro™ (MFR: 30) manufactured by Prime Polymer Co., Ltd., as (A), 46 vol % of a PP (MFR: 30) as (B), and 10 vol % of Sn—Cu-based (401) lead-free solder powder manufactured by Yamanishi Kinzoku Kabushiki Kaisha as (C), were fed at constant feed rates from hoppers of a high-speed rotation twin-screw kneading extruder. (A), (B) and (C), any two of which are phase-separated, were molten and kneaded, followed by extrusion into the shape of a strand, at a screw rotational speed of 1,200 rpm, at a maximum temperature of 230° C., which is lower than the pyrolysis temperatures of (A) and (B), and at a die temperature of 190° C. The extrudate was quenched in a water bath at 40° C., thereby producing an electrically conductive PP strand of Example 6 having a diameter of 1 mm. The electrical resistance of the strand was of the order of $10^{-5}$ Ωcm, i.e., exhibited electrical conductivity similar to those of metals.

The strand was cut into electrically conductive PP-compound pellets of a three-dimensional continuous parallel interface structure composition of Example 6. A cross-section in an extrusion direction and another cross-section perpendicular thereto of the pellet containing the tin component were observed using a SEM. As a result, a parallel multilayer structure was found, and therefore, it was confirmed that a three-dimensional continuous parallel interface structure was formed.

A rectangular plate having a thickness of 3 mm was produced using the pellet by injection molding with a commonly used method. The electrical resistance of the plate was of the order of $10^{-5}$ Ωcm, i.e., exhibited electrical conductivity similar to those of metals.

Example 7

Powder Catalyst for Powder Coating

Three components, i.e., 42 vol % of a curing agent for novolac phenolic resins, Type PR51530 manufactured by SUMITOMO BAKELITE Co., Ltd., as (A), 38 vol % of PR54869 as (B), and 20 vol % of an imidazole-based curing catalyst, C11ZCN (melting point: about 50° C.) manufactured by SHIKOKU CHEMICALS CORPORATION, as (C), were fed at constant feed rates from hoppers of a high-speed rotation twin-screw kneading extruder. (A), (B) and (C), any two of which are phase-separated, were molten and kneaded, followed by extrusion into the shape of a strand, at a screw rotational speed of 1,200 rpm, at a maximum temperature of 110° C., which is lower than or equal to the pyrolysis temperatures of (A) and (B), and at a die temperature of 100° C. The extrudate was cut using a hot cutter, followed by quenching in air, thereby obtaining masterbatch pellets of a cross-linking catalyst for powder coating of Example 7. A cross-section in an extrusion direction and another cross-section perpendicular thereto of the pellet, which imidazole was stained with a metal, were observed using a SEM. As a result, a parallel multilayer structure was found, and therefore, it was confirmed that a three-dimensional continuous parallel interface structure was formed. Next, the masterbatch was pulverized using a hammer mill and the pulverized masterbatch was classified according to the diameter (10 to 40 μm), thereby producing a powder catalyst of Example 7.

Two w % of the powder catalyst of this example, 38 w % of a powder of a curing agent for novolac phenolic resins, Type PRHF3 manufactured by SUMITOMO BAKELITE Co., Ltd., and 60 w % of a powder of a bisphenol-A epoxy resin, 1003F manufactured by Japan Epoxy Resins, Co., Ltd., containing 40 w % of titanium oxide, were uniformly applied to a zinc phosphate-treated cold-rolled steel having a thickness of 0.8 mm by electrostatic coating, followed by baking at 140° C. for 20 min, thereby forming a coating having a dry film thickness of 60 μm.

As a comparative example, 0.4 w % of a powder of a curing catalyst C11ZCN in place of the powder catalyst of this example, and other coating components, i.e., 39 w % of a powder of a curing agent for novolac phenolic resins, Type PRHF3 manufactured by SUMITOMO BAKELITE Co., Ltd., and 60.6 w % of a powder of a bisphenol-A epoxy resin, 1003F manufactured by Japan Epoxy Resins, Co., Ltd., containing 40 w % of titanium oxide, were dry-blended, and were uniformly applied to a zinc phosphate-treated cold-rolled steel having a thickness of 0.8 mm by electrostatic coating, followed by baking at 140° C. for 20 min, thereby forming a coating having a dry film thickness of 60 μm. The impact strength (load: 500 g, drop height: 50 cm) of the coating of the comparative example was visually compared with that of the powder coating employing the powder catalyst of this example. As a result, the comparative example was clearly poorer than the embodiment example.

Example 8

Easy Release Film

Two components, i.e., 33 vol % of an LDPE, NOVATEC™ (MFR: 5) manufactured by Japan Polyethylene Corporation, as (A) and 37 vol % of a PP, Prime Polypro™ (MFR: 5) manufactured by Prime Polymer Co., Ltd., as (B), were fed at constant feed rates from hoppers of a high-speed rotation twin-screw kneading extruder, and additionally, 30 vol % of a supernatant separated from unsalted butter molten by heating at 60° C. as (C) was fed by side-injection at a constant feed rate at an intermediate point of the extruder using a plunger pump. (A), (B) and (C), any two of which are phase-separated, were molten and kneaded, followed by extrusion into the shape of a strand, at a screw rotational speed of 1,200 rpm, at a maximum temperature of 200° C., which is lower than the pyrolysis temperatures of (A) and (B), and at a die temperature of 190° C. The strand was quenched in a water bath at 40° C. and was then cut, thereby obtaining translucent and colorless masterbatch pellets of a three-dimensional continuous parallel interface structure composition of Example 8. During production of the masterbatch, the butter did not blow out from the nozzle. Moreover, the pellet was not sticky and there was not a problem with process ability.

The absence of the stickiness of the pellet means that the viscous liquid butter not having compatibility with the base polymer is only about 0.1 µm in thickness on the pellet surface. This means that a butter layer inside the pellet also has a thickness of about 0.1 µm or so, and that a fine structure is quasi-stably formed inside the pellet. A cross-section in an extrusion direction and another cross-section perpendicular thereto of the pellet were washed with cyclohexane and were then observed by a SEM. As a result, a parallel multilayer structure was found, and therefore, it was confirmed that a three-dimensional continuous parallel interface structure was formed.

Five vol % of the masterbatch and 95 vol % of an LDPE, NOVATEC™ (MFR: 5) manufactured by Japan Polyethylene Corporation, were fed at constant feed rates. The mixture was extruded through a T-die into a laminate having a thickness of 10 µm, which was then laid on an aluminum foil-polypropylene laminated film having a thickness of 15 µm at 200° C., thereby producing a multilayer film of Example 8.

The multilayer film was cooled with liquid nitrogen and was then fractured. A resultant cross-section of the multilayer film was observed by a SEM. As a result, it was confirmed that a butter layer having a thickness of 0.13 µm was formed on the polyethylene layer of the multilayer film.

A pouch of 18 cm wide and 20 cm deep was created from this multilayer film by heat sealing, where the polyethylene layer of the multilayer film faces the inside of the pouch. One hundred gram of commercially available pre-cooked curry heated to 60° C. was poured into the pouch, and immediately thereafter, the pouch was turned upside down to allow the curry to spontaneously flow out. Thereafter, curry residue was weighed. The amount of the curry residue was 1.8 g.

For comparison, a pouch was created from a multilayer film which did not contain the masterbatch. In the case of this pouch, the amount of curry residue was 8.1 g. Therefore, the multilayer film of this example exhibits an excellent release property.

The result of SEM observation showed that continuous parallel interfaces did not exist in a cross-section of the multilayer film. This fact indicates that the three-dimensional continuous parallel interface structure which had been formed in the masterbatch was disrupted in the film, and was changed to a discontinuous polyblend which is typically observed.

Comparative Example

As is similar to Example 8, 70 vol % of a PP, Prime Polypro™ (MFR: 50), and 30 vol % of a supernatant separated from unsalted butter molten by heating at 60° C. as a liquid additive, were fed by side-injection at constant feed rates at an intermediate point of the extruder using a plunger pump. As a result, the butter was phase-separated from the PP, and blew out from the nozzle, and therefore, the mixture was not successfully extruded into the shape of a strand.

Example 9

Hydrophilic Nonwoven Fabric

As is similar to Example 8, two components, i.e., 34 vol % of an LDPE, NOVATEC™ (MFR: 5) manufactured by Japan Polyethylene Corporation, as (A) and 36 vol % of a PP, Prime Polypro™ (MFR: 5) manufactured by Prime Polymer Co., Ltd., as (B), were fed at constant feed rates from hoppers of a high-speed rotation twin-screw kneading extruder, and additionally, 30 vol % of a molten surfactant glycerol monostearate as a liquid additive (C) was fed by side-injection at a constant feed rate at an intermediate point of the extruder using a plunger pump. (A), (B) and (C), any two of which are phase-separated, were molten and kneaded, followed by extrusion, at a screw rotational speed of 1,200 rpm, at a maximum temperature of 200° C., which is lower than the pyrolysis temperatures of (A) and (B), and at a die temperature of 190° C. The extrudate was cut using a hot cutter, followed by quenching in air, thereby obtaining masterbatch pellets of a three-dimensional continuous parallel interface structure composition of Example 9. During production of the masterbatch, the molten glycerol monostearate did not blow out from the nozzle. Moreover, the pellet was not sticky and there was not a problem with process ability.

The masterbatch pellet was boiled in water at a bath ratio of 100:1 for 20 min to remove the glycerol monostearate. Thereafter, a cross-section in an extrusion direction and another cross-section perpendicular thereto were observed using a SEM. As a result, a parallel multilayer structure was found, and therefore, it was confirmed that a three-dimensional continuous parallel interface structure was formed.

Six parts by weight of the masterbatch was diluted with 94 parts by weight of a PP, Prime Polypro™ (MFR: 15) manufactured by Prime Polymer Co., Ltd. The dilution was used to produce a spunbond of Example 9 having a basis weight of 30 g/m$^2$ by melting and spinning with a commonly used method. When 1 ml of distilled water was dropped onto the spunbond using a pipette, the spunbond instantaneously absorbed the water, which indicates satisfactory hydrophilicity. The spunbond had a fiber diameter of about 20 µm. The glycerol monostearate content of the PP fiber is not more than 1 w %, and the thickness of the liquid additive containing the remaining 2 w % of glycerol monostearate which is considered to exist on the fiber surface, is calculated as about 0.1 µm.

Example 10

Anti-Corrosion Film

As is similar to Example 8, three components, i.e., 36 vol % of an LDPE, NOVATEC™ (MFR: 0.9) manufactured by Japan Polyethylene Corporation, as (A), 34 vol % of a PP, Prime Polypro™ (MFR: 5) manufactured by Prime Polymer Co., Ltd., as (B), and 30 vol % of an anti-corrosion agent DICHAN (dicyclohexylamine nitrite) as a liquid additive (C), were fed at constant feed rates from hoppers of a high-speed rotation twin-screw kneading extruder. (A), (B) and (C), any two of which are phase-separated, were molten and kneaded, followed by extrusion, at a screw rotational speed of 1,000 rpm, at a maximum temperature of 160° C., which is lower than the pyrolysis temperatures of (A) and (B), and at a die temperature of 150° C. The extrudate was cut using a hot cutter, followed by quenching in air, thereby obtaining anti-corrosion masterbatch pellets of a three-dimensional continuous parallel interface structure composition of Example 10. During production of the masterbatch, the molten DICHAN did not blow out from the nozzle. Moreover, the pellet was not sticky. Although the pellet was colored to light brown, there was not a problem with process ability.

The masterbatch pellet was boiled in water at a bath ratio of 100:1 for 20 min to remove the DICHAN. Thereafter, a cross-section in an extrusion direction and another cross-section perpendicular thereto were observed using a SEM. As a result, a parallel multilayer structure was found, and therefore, it was confirmed that a three-dimensional continuous parallel interface structure was formed.

Six parts by weight of the masterbatch was diluted with 94 parts by weight of an LDPE, NOVATEC™ (MFR: 0.9) manufactured by Japan Polyethylene Corporation. The dilution was used to produce an anti-corrosion inflation film of Example 10 having a thickness of 100 μm and a width of 20 cm by a commonly used method. Although this film contained about 1.8 g/m² of DAICHAN, the film was substantially colorless and slightly translucent. DAICHAN exhibits its anti-corrosion capability when it is contained in air at a concentration of 5 mg/L or more. This film was used to produce a cylindrical anti-corrosion pouch of Example 10 which was 20 cm wide and 30 cm long. The pouch had a maximum air capacity of about 3 L. The weight of the film used to produce the pouch was 8 g/pouch, and the DICHAN content was 144 mg/pouch. When about 10 W % of the DICHAN contained in the pouch vaporizes, the DICHAN concentration reaches a level which allows a sufficient anti-corrosion property. Therefore, it was demonstrated that the anti-corrosion property can be maintained for a sufficient long time.

The aforementioned embodiments and examples are only for the purpose of illustrating the present invention. The present invention is not limited to these examples. The base polymers (A) and (B) may be a polymer blend of a plurality of thermoplastic polymers. For example, in Example 2, a blend of two LDPEs having different molecular weights may be used as (A), and a blend of two PPs having different molecular weights may be used as (B). Although polymers of the same type are blended in this example, polymers of different types may be blended.

INDUSTRIAL APPLICABILITY

The polymer composition of the present invention quasi-stably contains a large amount of a substance which does not compatibility with a matrix polymer, and therefore, is useful for, for example, production of molded products having various properties, such as interface activation properties, release properties, anti-corrosion properties and the like.

The invention claimed is:
1. A polymer composition comprising:
a first base polymer (A) containing at least a thermoplastic polymer chosen from among addition polymers, condensation polymers, and thermoplastic precursors;
a second base polymer (B) containing at least a thermoplastic polymer chosen from among addition polymers, condensation polymers, and thermoplastic precursors and not having compatibility with the first base polymer (A); and
an additive (C) comprising a thermoplastic polymer chosen from among addition polymers, condensation polymers, and thermoplastic precursors, and containing at least a substance not having compatibility with any of the first base polymer (A) and the second base polymer (B), the additive (C) being in the form of liquid or slurry at the lower of a pyrolysis temperature of the first base polymer (A) and a pyrolysis temperature of the second base polymer (B),
wherein (A), (B) and (C) are phase-separated from each other, and interfaces each located between two of phases of (A), (B) and (C) contacting each other form three-dimensional continuous parallel interfaces,
said three-dimensional continuous parallel interfaces referring to each of the opposite sides of a layer which separates two regions in a gyroid structure, said gyroid structure referring to an interconnected structure in which a continuous layer periodically extends throughout a space, dividing the space into two regions,
wherein components (A), (B) and (C) form a parallel layer having a gyroid structure, and (A) and (B) occupy two respective regions separated by (C), wherein said continuous parallel interfaces include an interface α between (B) and (C) and an interface β between (A) and (C) of a layer formed of (C), and an interface γ between (A) and (B) wherein the interfaces α, β, and γ are parallel with each other, and three-dimensionally and continuously extend throughout space
wherein at least one of (A) and (B) is a polyolefin, a polystyrene, a polyester, a polyamide, polycarbonate, polyurethane, and an unsaturated polyester resin precursor or a phenol resin precursor; and
additive (C) is polydifluoroethylene, tetrafluoroethylene-ethylene copolymer, tetrafluoroethylene-perfluoroalkyl vinyl ether copolymer, polystyrene, styrene oligomer, polyethylene glycol, polypropylene glycol, a polyvinyl butyral, a poly(vinyl alcohol-vinyl acetate) copolymer, polyvinyl acetate or saponified polyvinyl acetate.

2. The polymer composition of claim 1, wherein (C) further comprises at least one selected from the group consisting of oils, insecticides, pheromones, repellents, attractants, adhesives, surfactants, release agents, antibacterial agents, antifungal agents, flame resistant agents, lubricating agents, low-friction agents, reinforcing materials, electro-conductive agents, heat transfer agents, anti-corrosion agents, and electrolytic solutions.

3. A molded product comprising the polymer composition of claim 2, wherein the electro-conductive agent is a thermoplastic and highly electrically conductive composition.

4. The polymer composition of claim 1, wherein at least one of (A), (B) and (C) is a gas barrier thermoplastic resin.

5. The polymer composition of claim 4, wherein the gas barrier thermoplastic resin is at least one of vinyl alcohol-vinyl acetate copolymer, polyvinylidene chloride, thermoplastic polyacrylonitrile, and polyamides.

6. The polymer composition of claim 1, wherein at least one of (A), (B) and (C) is a thermoplastic adhesive.

7. The polymer composition of claim 6, wherein the thermoplastic adhesive is an adhesive for at least one of ceramic, metal, wood, and plastic.

8. A molded soil release composite product which is a multilayer structure of the polymer composition of claim 6 and a fluoropolymer molded product.

9. The polymer composition of claim 1, wherein at least one of (A), (B) and (C) is one of polyolefin resins, modified polyolefin resins, and polymer blends containing at least one of polyolefin resins and modified polyolefin resins.

10. The polymer composition of claim 1, wherein at least one of (A), (B) and (C) is one of fluoropolymers, modified fluoropolymers, and polymer blends containing at least one of fluoropolymers and modified fluoropolymers.

11. A separator for condensers or capacitors, wherein the separator is formed of a film or a fiber containing the polymer composition of claim 10.

12. A molded product comprising the polymer composition of claim 1 as a part thereof.

13. The molded product of claim 12, wherein the molded product is formed by extrusion molding or injection molding.

14. The molded product of claim 13, wherein (C) further comprises at least one of edible oils, adhesives and anti-corrosion agents, and the molded product is formed in the shape of a film.

15. The molded product of claim 12, wherein at least one of (A), (B) and (C) is a substance having an electrical resistance of $10^{15} \Omega cm$ or more.

16. The molded product of claim 15, wherein the molded product is a filter including a melt blown nonwoven fabric or a multilayer structure of a melt blown nonwoven fabric.

17. A molded product obtained by diluting the polymer composition of claim 1 with one of (A), (B) and polymers having compatibility with (A) or (B), and molding the dilution of the polymer composition.

18. The molded product of claim 17, comprising a film made of (C) and having a thickness from 0.001 μm to 2 μm on a surface thereof.

19. A fluid having fluidity, wherein the fluid contains a mixture of the polymer composition of claim 1 in the form of powder and a liquid.

20. An ink comprising the polymer composition of claim 1.

21. A paint comprising the polymer composition of claim 1.

22. The polymer composition of claim 1, wherein
the polyolefin is one of a polyethylene, polypropylene, polymethacrylate, polyisoprene, or polybutene,
the polyester is one of polyethylene terephthalate, polybutylene terephthalate, polytrimethylene terephthalate or polylactic acid, and
the polyamide is one of nylon 6, nylon 66 or nylon 12.

* * * * *